(12) United States Patent
Amaya et al.

(10) Patent No.: US 6,680,348 B1
(45) Date of Patent: Jan. 20, 2004

(54) CEMENT DISPERSANT AND CONCRETE COMPOSITION CONTAINING THE DISPERSANT

(75) Inventors: Toshihiko Amaya, Yokohama (JP); Akira Ikeda, Funabashi (JP); Jun Imamura, Hiratsuka (JP); Atsushi Kobayashi, Hiratsuka (JP); Kaname Saito, Yokohama (JP); Wernher M. Danzinger, Hiratsuka (JP); Tetsu Tomoyose, Chigasaki (JP)

(73) Assignees: Sika Ltd., Hiratsuka (JP); Toho Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 09/868,590

(22) PCT Filed: Dec. 24, 1999

(86) PCT No.: PCT/JP99/07261

§ 371 (c)(1),
(2), (4) Date: Jun. 20, 2001

(87) PCT Pub. No.: WO00/39045

PCT Pub. Date: Jul. 6, 2000

(30) Foreign Application Priority Data

Dec. 25, 1998 (JP) .......................................... 10-376862

(51) Int. Cl.$^7$ ................................................ C08K 3/00
(52) U.S. Cl. .......................... 524/2; 106/724; 106/727; 106/728; 106/823; 524/4; 524/5; 526/304
(58) Field of Search ................................. 106/724, 727, 106/728, 823; 524/2, 4, 5; 526/304

(56) References Cited

U.S. PATENT DOCUMENTS 5,215,827 A * 6/1993 Dotzauer et al. ............ 428/500
5,369,198 A * 11/1994 Albrecht et al. ............. 526/240
6,211,317 B1 * 4/2001 Albrecht et al. ............. 526/271

FOREIGN PATENT DOCUMENTS

JP      A 7-33496      2/1995

* cited by examiner

*Primary Examiner*—Bernard Lipman
(74) *Attorney, Agent, or Firm*—Oliff & Berridge, PLC

(57) ABSTRACT

A cement dispersant (especially a dispersant for concretes with ultrahigh performance) comprising as a main component a water-soluble amphoteric copolymer obtained by copolymerizing (A) a polyamide-polyamine of an alkylene oxide adduct thereof with (B) (meth)acrylic acid or an alkali metal, ammonium, or alkanolamine salt thereof and (C) a polyalkylene glycol ester of (meth)acrylic acid in an A/B/C ratio of (10–40)/(10–40)/(50–80) (wt. %); and a concrete composition (especially an ultral high-performance concrete) containing the dispersant. The dispersant satisfies all of a water-reducing effect, slump flow retention, strength development, etc.

4 Claims, No Drawings

CEMENT DISPERSANT AND CONCRETE COMPOSITION CONTAINING THE DISPERSANT

TECHNICAL FIELD

The present invention relates to a cement dispersant and a concrete composition containing the dispersant. In more detail, the present invention relates to a cement dispersant having superior dispersion effect of cement particles and its retention, thereby obtaining greater water-reducing effect and long slump flow retention, so that a workability is excellent and strength development after hardening is good, particularly a cement dispersant suitable for concretes with ultrahigh performance, and a concrete composition such as an ultrahigh performance concrete composition containing the dispersant.

BACKGROUND ART

Polycarboxylic acid type dispersants such as a copolymer of polymelamine sulfonate, lignin sulfonate, olefin and maleic acid and the like have conventionally been used as a cement dispersant. However, these compounds have problems in not only their effect connoting as slump flow retention effect, but their suitability in existing as well as future ultrahigh performance concrete.

New type polycarboxylic acid type cement dispersants having nonionic groups introduced therein are positively proposed to solve these problems. For example, JP-A 1-226757 discloses a copolymer of (meth)acrylate, (meth)acryl sulfonate, and monoacrylate ester of polyethylene glycol alkyl ether or monoacrylate ester of polypropylene glycol alkyl ether. However, conventional cement dispersants including the one disclosed in the above publication have not yet been satisfactory as to all of water reducing effect, slump flow retention, strength development and the like in order to use as a compounded concrete with said dispersants.

Therefore, there is a strong call in the industry for cement dispersants meeting sufficient water reducing effect, slump flow retention, strength development and the like, applicable even to ultrahigh performance concrete.

The present invention has been made to meet this demand, and has an object to provide a cement dispersant with satisfactory water reducing effect, slump flow retention, strength development and the like, and a concrete composition containing said dispersant in order to solve the problems existing in the prior art.

DISCLOSURE OF INVENTION

After extensive investigation into finding the solution for the problems, the present inventors have found a copolymer comprising three specific organic substances with the desired effect, and have completed the present invention as described.

That is, the present invention relates to a cement dispersant comprising a water soluble amphoteric copolymer, as a main component, obtained by copolymerizing an addition product(compound A) obtained by the addition of 0–8 moles of an alkylene oxide having 2 to 4 carbon atoms to one equivalent of amino residues in polyamide polyamine obtained by condensation of 1.0 mole of a polyalkylene polyamine, 0.8–0.95 mole of a dibasic acid or an ester of the dibasic acid with a lower alcohol having 1 to 4 carbon atoms, and 0.05–0.18 mole of acrylic acid or methacrylic acid, or an ester of acrylic acid or methacrylic acid with a lower alcohol having 1 to 4 carbon atoms, and a compound (compound B) of the formula I:

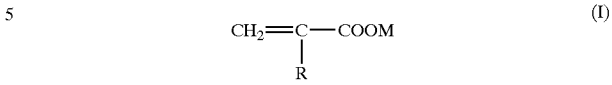

(wherein R is hydrogen atom or methyl group, and M is hydrogen atom, alkali metal, ammonium group or alkanolammonium group), and a compound (compound C) of the formula II:

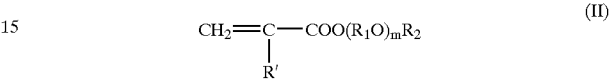

(wherein R' is hydrogen atom or methyl group, $R_1$ is $C_2$–$C_4$ alkylene group, $R_2$ is hydrogen atom or $C_1$–$C_4$ alkyl group, and m is an integer of 1 to 100), in the ratio of compound A:compound B:compound C=10–40% by weight:10–40% by weight:50–80% by weight.

The present invention also particularly relates to said cement dispersant of the present invention used in an ultrahigh performance concrete composition.

The cement dispersant of the present invention can also be used as a general purpose high performance AE water reducing agent by blending techniques available for regular concrete.

The present invention further relates to a concrete composition characterized by having said cement dispersant of the present invention, and particularly the concrete composition for an ultrahigh-performance concrete. The "ultrahigh performance concrete" described herewith denotes concrete generally used and understood in the pertinent art, and encompasses concretes in considerably broad range, and includes, for example, concrete showing strength equal to or higher than the conventional concrete even when less amount of water is used as compared with the conventional concrete, or more specifically concrete that provides a highly workable ready-mixed concrete without interfering in general use even when a water/binder ratio is 20% or less, particularly about 12%, and yet with a compression strength of 150 N/mm² or more upon hardening.

As described above, the compound A used in the present invention is an addition product obtained by the addition of specific amount of an alkylene oxide (compound d) to the polyamide polyamine achieved by condensation of a polyalkylene polyamine (compound a), a dibasic acid or an ester of the dibasic acid with a lower alcohol having 1 to 4 carbon atoms (compound b), and acrylic acid or methacrylic acid, or an ester of acrylic acid or methacrylic acid with a lower alcohol having 1 to 4 carbon atoms (compound c), in a definite proportion.

Examples of the polyalkylene polyamine of the compound a include diethylene triamine, triethylene tetramine, tetraethylene pentamine, pentaethylene hexamine, dipropylene triamine, tripropylene tetramine and tetrapropylene pentamine, but diethylene triamine and triethylene tetramine are preferable from both points of effectiveness and economical angle.

Examples of the dibasic acid and its lower alcohol ester having 1 to 4 carbon atoms of the compound b include, for example, malonic acid, succinic acid, fumaric acid, maleic acid, glutaric acid, adipic acid, pimelic acid, phthalic acid, azelaic acid, sebacic acid, and their esters with lower alcohols having 1 to 4 carbon atoms such as methanol, ethanol, propanol or butanol, or their isomers, if present. Of those, adipic acid is most preferable from both effectiveness and economical angle.

Examples of acrylic acid or methacrylic acid and its lower alcohol ester having 1 to 4 carbon atoms, of the compound c include, for example, acrylic acid, methacrylic acid, methyl acrylate, methyl methacrylate, ethyl acrylate, ethyl methacrylate, propyl acrylate, propyl methacrylate, butyl acrylate and butyl methacrylate.

The polyamide polyamine comprising three components of the above compounds a, b and c can easily be obtained by the conventional polycondensation technique.

The alkylene oxide having 2 to 4 carbon atoms, which is the compound d, to be added to amino residue of polyamide polyamine is ethylene oxide, propylene oxide or butylene oxide. One or more of alkylene oxides described may be used.

Preparation of the polyamide polyamine, inter alia, polycondensation reaction of the compounds a, b and c, may be two-step reaction comprising polycondensation of only the compound a and the compound b, thereafter further polycondensation with the compound c as a monobasic acid, or one step reaction comprising simultaneous polycondensation with the compounds a, b and c from the start.

However, either method leads to the same polycondesation reaction, that is amidation reaction in which acrylic acid residue or methacrylic acid residue of the compound c are ultimately found at the end of a polyamide chain since the amidation reaction proceeds in parallel to amide interchange reaction.

Following is a reaction molar ratio of the three components constituting the polyamide polyamine described below.

The reaction molar ratio of the compound b (dibasic acid or its ester) to one mole of the compound a (polyalkylene polyamine) is 0.8–0.95 mole. Polycondensation product of the compound a and the compound b in molar ratio defined above produces, on the average, a polyamide with a certain chain length, comprising polycondensation of from (polyalkylene polyamine 5 moles:dibasic acid 4 moles) to (polyalkylene polyamine 20 moles:dibasic acid 19 moles), and therefore, the dispersant obtained by using the polyamide exhibits high water reducing property and slump flow retention. When the chain length of this polyamide is shorter than the case described above (the reaction ratio is less than 0.8 mole), the dispersant obtained by using the polyamide shorter in chain length has markedly decreased slump flow retention. If the chain length is longer than the above (the reaction ratio exceeding 0.95 mole), water reducing property considerably decreases, which is not desirable.

The polyamide polyamine according to the present invention has acrylic acid residue or methacrylic acid residue of 0.25 mole (in the case of a:b:c=1.0:0.8:0.05 (mole)) to 3.6 moles (in the case of a:b:c=1.0:0.95:0.18 (mole)), but the preferable range is 0.5–2.0 moles from the standpoint of effect. When the value is lower than 0.25 mole (for example, in the case of a:b=1.0:0.8 and that quantity ratio of compound c to compound a is less than 0.05), the proportion of the compound A obtained from this ratio in the final copolymer decreases, and property as a cement dispersant is substantially diminished. On the other hand, if it exceeds 3.6 moles (for example, in the case of a:b=1.0:0.95 and that quantity ratio of the compound c to the compound a exceeds 0.18), over formation of the three-dimensional structure of the copolymer is observed and a sufficient effect can not be obtained.

Amount of alkylene oxide to be added to the polyamide polyamine is 0–8 moles per one equivalent of amino residue of the polyamide polyamine. If it exceeds 8 moles, molecular weight of the compound A increases with inevitable decrease in cation equivalent and sufficient effect as the amphoteric polymer expected of the present invention is not obtained. The addition of the alkylene oxide in the present invention is desirable and the amount thereof is preferably 0.5–6.0, most preferably 1.0–5.5, to one equivalent of amino residue of the polyamide polyamine.

Examples of the compound B used in the present invention include acrylic acid ormethacrylic acid, and their sodium, potassium, ammonium, monoethanol amine, diethanol amine or triethanol amine salts, but sodium or ammonium salts are preferable from the standpoints of effectiveness and economical efficiency.

Examples of the compound C used in the present invention include methacrylic acid esters or acrylic acid esters of methoxypolyethylene glycol, methacrylic acid esters or acrylic acid esters of ethoxypolyethylene glycol, methacrylic acid esters or acrylic acid esters of methoxypolyethylene glycol/polypropylene glycol copolymer, and monoacrylic acid or monomethacrylic acid esters of polyethylene glycol.

Production of the water-soluble amphoteric copolymer in the present invention can easily be carried out using the compound A, the compound B and the compound C by the conventional method in the pertinent art.

Copolymerization ratio of compound A:compound B:compound C in the copolymer of the present invention is in a range of 10–40:10–40:50–80, and is appropriately selected such that the sum is 100 as the weight basis. If the ratio is outside the above range, the effects below can not be obtained.

The water soluble amphoteric copolymer thus obtained in the present invention has the characteristic of having extremely superior water reducing property and prolonged slump flow retention as a cement dispersant, and is possible to exhibit the performance that has not been achieved as cement dispersants heretofore in use or otherwise proposed. These advantages seemed to be brought about by having a nonionic hydrophilic group comprising carboxyl group (anionic group), polyalkylene polyamide group (cationic group) and alkoxypolyalkylene glycol group in the molecular structure of the copolymer, and thus the basic concept of the present invention is in the use of the copolymer having such a unique structure. In particular, the copolymer having specific amide group functioning as cationic radical has not yet heretofore been proposed, and therefore striking effect that has been observed but not predicted is in fact surprising. JP-A 7-33496 discloses the technique in which polyamide polyamine is incorporated as a copolymer component for cement dispersant, however, a copolymer using the polyamide polyamine defined in the technique disclosed by JP-A 7-33496 has the limit in water-reducing property, slump flow retention, hardening and the like when water/cement ratio or water/binder ratio in a concrete is 30% or less, and thus superior water reducing property and slump flow retention observed in the present invention can not be expected.

In general, it is known that use of a polymer type compound having many anionic groups in the molecule is effective as a dispersant in order to disperse substances with positively charged surface such as cement particles as well as to retain its fluidity in the presence of a small amount of water.

It is known that anion moiety of polymer adsorbs positively charged particles and neutralize them, and the polymer thus adsorbed provides good dispersion system by its electric repulsion force of negative charges, and it is also generally discussed that fluidity of dispersion system is likely to be enhanced with stronger electric repulsion force among particles.

It is apparent that sulfonic acid group which is an anionic group functions in, for example, β-naphthalenesulfonic acid/formalin high condensate or the like, and carboxyl group which is an anionic group functions in salt of lower α-olefin/maleic anhydride copolymer or sodium polyacrylate.

Further, it is said that (meth)acrylic acid/alkoxypolyethoxy (meth) acrylate copolymer and the like can exhibit their dispersion and fluidity by that carboxyl group and bulky alkoxypolyalkylene glycol group acting among particles.

However, it is the state of art for these currently available compounds that there is the limit in fluidity effect for an ultrahigh-performance concrete with a small amount of water present, and the problem on slump flow retention can not be solved. Further, it is possible to add an excess amount of water in order to achieve an initial fluidity, but this is out of the question as a concrete for structures as setting becomes extremely slow with acute possibility of poor hardening.

As a result of investigations into various copolymers, the present inventors have finally found the copolymer described in the present invention far superior to the performance of currently available compounds and are trying to elucidate such a mechanism at the present time.

It is considered that the polycarboxyl groups of the water-soluble amphoteric copolymer according to the present invention participates in neutralization of charges as well as an electric repulsion force among cement particles, and it is supposed that the terminal hydroxyl group of the polyamide polyamine group greatly influences in slump flow retention with the cationic group moiety having the specific amide group in the present invention showing some charge regulating action.

Further, it is supposed that carboxyl group, alkoxypoly-alkylene glycol group and polyamide polyamine group which constitute the compound of the present invention sufficiently bear their corresponding roles in achieving good effect in the dispersion system, and yet the synergistic action among them have been demonstrating remarkable effect.

BEST MODE FOR CARRYING OUT THE INVENTION

Although the amount of the cement dispersant comprising the water-soluble amphoteric copolymer of the present invention to be added varies depending on the compounding conditions including materials used in said concrete, as a general rule, about 0.1–1.5% in terms of the solid content in cement is added. That is, the more dispersant added, the better water reducing property and slump flow retention are. However, setting retardation and in the worst case, poor hardening may be observed if the amount added is too much excess. The way to use the present invention is the same as in currently available general cement dispersants, and the cement dispersant of the present invention is added in the form of a stock solution at the time of kneading concrete or in previously diluted form with kneading water. Alternatively, the dispersant may be added after kneading a concrete or a mortar, and the resulting mixture may again be kneaded to comparable homogeneity.

The present invention also relates to a concrete composition containing said cement dispersant of the present invention. Components other than the cement dispersant described are the conventionally used components for concrete such as ordinary Portland cement, early-strength Portland cement, low heat-moderate heat Portland cements or blast furnace cement for cements, fine aggregates or course aggregates for aggregates, silica fume, calcium carbonate powder or slag powder for admixtures, expanding agent., and water. It is needless to say that the conventional dispersants, water reducing agents, air entraining agents, defoaming agents and the like, other than the dispersant of the present invention, can appropriately be compounded. The compounding proportion of each of these components can easily be determined according to the kind of component selected and objectives.

EXAMPLES

The present invention is described further in more details by showing the examples, but the invention is not limited to the particular embodiments described herein.

I. Synthesis of Water-soluble Amphoteric Copolymer

Example 1

Diethylene triamine 103 g (1.0 mole) and adipic acid 125 g (0.86 mole) were charged in a reaction vessel equipped with a stirrer, and mixed by stirring under a nitrogen atmosphere by introduction of nitrogen. Temperature was adjusted to 150° C., and the reaction was continued for 20 hours until acid value reaches 18 while removing water of reaction product accompanied with polycondensation. Next, hydroquinone methyl ether 0.3 g and methacrylic acid 12.3 g (0.14 mole) were charged, and reacted at the same temperature (150° C.) for 10 hours. By this, polyamide polyamine 209 g (melting point 110° C., acid value 19) was obtained together with 32 g in total of reaction distilled water. The total amount of the polyamide polyamine thus obtained was dissolved in water 503 g, and temperature was adjusted to 50° C. Ethylene oxide 127 g (corresponding to 2.0 moles to the total amino residue including unreacted amino group) was sequentially added over 2 hours at the same temperature (50° C.), and matured for 2 hours. Compound A-1 (solid content 40%) 839 g of the present invention was obtained.

Water 1,270 g was charged in a reaction vessel equipped with a stirrer, and nitrogen was introduced to make the inside of synthesis system to be a nitrogen atmosphere and temperature was adjusted to 90° C. Three solutions of a mixture of compound A-1 500 g, sodium methacrylate salt (compound B) 200 g and methoxypolyethylene glycol monomethacrylate (compound C, molecular weight 2,000) 600 g (compound A/compound B/compound C=20 parts by weight/20 parts by weight/60 parts by weight in terms of weight ratio of solid content, the total being 100 parts by weight), 5% ammonium thioglycolate aqueous solution 400 g and 5% ammonium persulfate aqueous solution 400 g were simultaneously added dropwise to the synthesis system over 2 hours. After completion of the dropwise addition, 5% ammonium persulfate aqueous solution 100 g was further added dropwise over 30 minutes, and maturation was then conducted for 2 hours to obtain 3,470 g of a water soluble amphoteric copolymer (Example 1).

This copolymer (Example 1) was a copolymer having a weight average molecular weight by GPC molecular weight measurement of 32,000. The measurement conditions are as follows.

Column: OHpak SB-802HQ, OHpak SB-803HQ, OHpak SB-804HQ (products of Showa Denko K. K.)

Eluate: Ratio of 50 mM sodium nitrate aqueous solution and acetonitrile 80:20

Detector: Differential refractometer

M.W.Calibration standard: Polyethylene glycol

Examples 2–9

Using starting materials as in Table 1, polyamide polyamine alkylene oxide adduct compounds A-2 to A-7 were obtained in the same manner as in Example 1.

Using compound A, compound B and compound C as in Table 2, copolymerization was conducted in the same manner as in Example 1 to obtain water soluble amphoteric copolymers (Examples 2–9) (water content of the copolymers thus obtained was adjusted to a solid content of 30%)

TABLE 1

Synthetic Examples of compounds A-1 to A-7[*1]

| Compound A | | A-1 | A-2 | A-3 | A-4 | A-5 | A-6 | A-7 |
|---|---|---|---|---|---|---|---|---|
| (a) | DETA[*2] | 1.00 | 1.00 | 1.00 | — | — | 1.00 | 1.00 |
| | TETA[*3] | — | — | — | 1.00 | 1.00 | — | — |
| (b) | Adipic acid | 0.86 | 0.91 | 0.83 | 0.88 | 0.91 | 0.80 | 0.88 |
| | Acid value of intermediate condensate[*4] | 18 | 19 | 15 | 20 | 20 | 21 | 18 |
| (c) | Acrylic acid | — | 0.09 | — | 0.14 | 0.10 | — | 0.10 |
| | Methacrylic acid | 0.14 | — | 0.17 | — | — | 0.16 | — |
| | Acid value of final condensate[*5] | 19 | 19 | 17 | 19 | 21 | 20 | 17 |
| (d) | Ethylene oxide | 2.0 | 2.0 | 5.0 | 3.0 | 2.0 | 1.0 | 3.0 |
| | Propylene oxide | — | 2.0 | — | 1.0 | — | 2.0 | — |

[*1]Components (a)–(d) used to produce compound A in the Table correspond to the compounds a to d described above, and each numeral value shows structural molar ratio.
[*2]Diethylene triamine
[*3]Triethylene tetramine
[*4]Acid value of condensate (intermediate condensate) of compound a and compound b
[*5]Acid value of condensate (final condensate) of compound a, compound b and compound c

TABLE 2

Examples 1–9[*1]

| | Example No. | | | | | | | | |
|---|---|---|---|---|---|---|---|---|---|
| | 1 | 2 | 3 | 4 | 5 | 6 | 7 | 8 | 9 |
| Compound A | | | | | | | | | |
| A-1 | 20 | — | — | — | — | — | — | — | — |
| A-2 | — | 20 | — | — | — | — | — | — | — |
| A-3 | — | — | 15 | — | — | — | — | — | — |
| A-4 | — | — | — | 30 | — | — | — | 25 | — |
| A-5 | — | — | — | — | 25 | — | — | — | 13 |
| A-6 | — | — | — | — | — | 33 | — | — | — |
| A-7 | — | — | — | — | — | — | 20 | — | — |
| Compound B | | | | | | | | | |
| Na acrylate | — | 20 | 27 | — | — | 12 | — | — | — |
| NH$_4$ acrylate | — | — | — | — | — | — | 15 | — | — |
| Na methacrylate | 20 | — | — | 15 | 20 | — | — | 20 | 14 |
| Compound C | | | | | | | | | |
| C-1[*2] | — | 60 | — | — | — | — | — | — | — |
| C-2[*3] | — | — | — | 55 | — | — | — | — | — |
| C-3[*4] | — | — | 58 | — | — | — | — | 55 | — |
| C-4[*5] | 60 | — | — | — | 55 | — | — | — | — |
| C-5[*6] | — | — | — | — | — | 55 | — | — | 73 |
| C-6[*7] | — | — | — | — | — | — | 65 | — | — |

TABLE 2-continued

Examples 1–9[*1]

| | Example No. | | | | | | | | |
|---|---|---|---|---|---|---|---|---|---|
| | 1 | 2 | 3 | 4 | 5 | 6 | 7 | 8 | 9 |
| Weight average molecular weight of copolymer ($\times 10^3$) | 32.0 | 35.1 | 42.5 | 35.3 | 37.5 | 30.7 | 47.2 | 44.2 | 38.5 |

[*1]Value of compounds A–C in the Table is structural weight part on the basis of solid content
[*2]Methoxypolyethylene glycol acrylate (molecular weight 400)
[*3]Methoxypolyethylene glycol methacrylate (molecular weight 1,000)
[*4]Methoxypolyethylene glycol acrylate (molecular weight 2,000)
[*5]Methoxypolyethylene glycol methacrylate (molecular weight 2,000)
[*6]Propoxypolyethylene glycol acrylate (molecular weight 3,000)
[*7]Methoxypolyethylene glycol methacrylate (molecular weight 3,000)

Comparative Examples 1–4

Condensation compounds were synthesized in the same manner as in Example 1 except that reaction proportion of polyalkylene polyamine and dibasic acid and (meth)acrylic acid was out of the range described in the present invention (compounds A'-1 to compounds A'-4). Table 3 shows the Synthetic Examples.

These compounds A'-1 to compounds A'-4, compound B and compound C were copolymerized to obtain water soluble amphoteric copolymers (Comparative Examples 1–6). Table 4 shows the Synthetic Examples.

TABLE 3

Synthetic Examples of compounds A'-1 to compounds A'-4[*1]

| Comparative compound A' | | A'-1 | A'-2 | A'-3 | A'-4 |
|---|---|---|---|---|---|
| (a) | DETA[*2] | 1.00 | 1.00 | — | 1.00 |
| | TETA[*3] | — | — | 1.00 | — |
| (b) | Adipic acid | 0.60 | 0.80 | 0.70 | 0.97 |
| | Acid value of intermediate condensate[*4] | 18 | 19 | 20 | 23 |
| (c) | Methacrylic acid | 0.75 | 0.50 | 0.50 | 0.04 |
| | Acid value of final condensate[*5] | 17 | 18 | 18 | 25 |
| (d) | Ethylene oxide | 2.0 | 5.0 | 3.0 | 2.0 |

[*1]Components (a)–(d) used to produce compound A' in the Table correspond to the compounds a to d described above, and each numeral value shows structural molar ratio.
[*2]Diethylene triamine
[*3]Triethylene tetramine
[*4]Acid value of condensate (intermediate condensate) of compound a and compound b
[*5]Acid value of condensate (final condensate) of compound a, compound b and compound c

TABLE 4

Comparative Examples 1–6[*1]

| | Comparative Example No. | | | | | |
|---|---|---|---|---|---|---|
| | 1 | 2 | 3 | 4 | 5 | 6 |
| Compound A' | | | | | | |
| A'-1 | 20 | — | — | — | — | — |
| A'-2 | — | 15 | — | — | — | — |
| A'-3 | — | — | 15 | — | — | — |
| A'-4 | — | — | — | 20 | — | — |
| Compound B | | | | | | |
| Na methacrylate | 20 | 25 | 25 | 25 | 40 | 35 |
| Compound C | | | | | | |
| C-1[*2] | 60 | — | — | — | — | — |
| C-2[*3] | — | — | 60 | — | 60 | — |
| C-3[*4] | — | 60 | — | — | — | — |
| C-4[*5] | — | — | — | 55 | — | 65 |
| Weight average molecular weight of copolymer ($\times 10^3$) | 47.3 | 49.7 | 39.5 | 40.5 | 42.5 | 38.7 |

[*1]Value of compound A', compound B and compound C in the Table is structural weight part on the basis of solid content
[*2]Methoxypolyethylene glycol acrylate (molecular weight 400)
[*3]Methoxypolyethylene glycol methacrylate (molecular weight 1,000)
[*4]Methoxypolyethylene glycol acrylate (molecular weight 2,000)
[*5]Methoxypolyethylene glycol methacrylate (molecular weight 2,000)

II. Test Example 1

Evaluation of Water Soluble Amphoteric Copolymer in Ultrahigh Performance Concrete In this Test Example, test was conducted for the purpose of a concrete that "shows slump flow of 60 cm or more in 2 hours after production of a ready-mixed concrete without material separation, starts to set within 24 hours, and has a compression strength of 150 N/mm² or more on the 91st day" as an ultrahigh performance concrete. Silica fume was used as a powder together with a cement (those in combination is called a binder), and the test of water soluble amphoteric copolymer was conducted using the concrete formulation shown in Table 5 under the condition that a water/binder ratio is 16% and 12%.

Mixing of a concrete was done by a 50 liters forced twin-screw mixer, and after cement, silica fume, fine aggregates, course aggregates and water having ½ amount of water soluble amphoteric copolymer cement dispersant dissolved therein were added and mill-mixed for 60 seconds, the remaining water soluble amphoteric copolymer was added to the mixer, followed by mill-mixing for 150 seconds.

Slump, slump flow and external quality were determined immediately after discharge, after 1 hour and after 2 hours and the concrete left to standing in a thermostatic chamber at 20° C. was examined if setting begun within a predetermined period of time as well as a compression strength after 91 days.

Slump was measured according to JIS A-1101, slump flow was measured according to JASS5-T503, and compression strength was measured according to JIS A-1108.

The amount of the water soluble amphoteric copolymer added to the binder was determined in such a way that slump flow immediately after discharge was about 65 cm and tests were conducted with the amount of copolymer corresponding to slump flow of 65 cm or less when no further effect was achieved even by the extra addition as in Comparative Examples 5 and 6 shown in Table 6 and Comparative Examples 3 and 4 shown in Table 7.

As is obvious from the results shown in Table 6, concretes with good condition were obtained by the water soluble amphoteric copolymers of Examples 1–9 even under the condition that the amount of water was extremely small signified by the water/binder ratio of 16%, and further the slump flow of 60 cm or more that satisfies the criterion of workability lasted for over 2 hours.

Further, since setting begins within 24 hours, there was no problem on hardening.

Table 7 shows test results of 12% water/binder ratio which is far beyond the common knowledge of concrete engineering, but a concrete with good condition was obtained by the water soluble amphoteric copolymer of the present invention, and slump flow of 60 cm or more over 2 hours that is a standard of workability was achieved. Further, there was no problem on hardening since setting begins within 24 hours and it is obvious that contribution to concrete engineering by a water soluble amphoteric copolymer by the present invention was really immense.

TABLE 5

Formulation of concrete (unit: kg/m$^3$)

| | Formulation No. | |
|---|---|---|
| | Formulation-1 | Formulation-2 |
| W/B (%) | 16.0 | 12.0 |
| Water*1 | 140 | 150 |
| Cement*2 | 788 | 1125 |
| Silica fume*3 | 88 | 125 |
| Fine aggregates*4 | 529 | 381 |
| Course aggregates*5 | 970 | 765 |

*1City water
*2In Formulation-1, moderate heat Portland cement (specific gravity 3.21)
In Formulation-2, low heat Portland cement (specific gravity 3.22)
*3Microsilica (product of L Chem. Co.) (specific gravity 2.20)
*4Land sand from Kimitsu (specific gravity 2.63)
*5Crushed stone from Kudamatsu City (specific gravity 2.74)

TABLE 6

Concrete test result [Case of using concrete formulation-1 (W/B = 16%)]

| Test No. | Copolymer No. | Amount added*1 | Slump(cm)*2 | | | Slump flow(cm)*2 | | | Appearance*3 | Setting*4 | Compression strength (N/mm$^2$) |
|---|---|---|---|---|---|---|---|---|---|---|---|
| | | | Immediately after | 1 Hour | 2 Hours | Immediately after | 1 Hour | 2 Hours | | | |
| 1 | Example 1 | 0.90 | ≧25 | ≧25 | ≧25 | 66.0 | 64.5 | 62.5 | ○ | present | 184 |
| 2 | Example 2 | 1.00 | ≧25 | ≧25 | ≧25 | 65.0 | 63.0 | 61.5 | ○ | present | 180 |
| 3 | Example 3 | 1.10 | ≧25 | ≧25 | ≧25 | 64.0 | 62.0 | 60.5 | ○ | present | 182 |
| 4 | Example 4 | 1.10 | ≧25 | ≧25 | ≧25 | 65.5 | 64.5 | 63.5 | ○ | present | 178 |
| 5 | Example 5 | 0.90 | ≧25 | ≧25 | ≧25 | 65.5 | 63.5 | 61.5 | ○ | present | 185 |
| 6 | Example 6 | 0.90 | ≧25 | ≧25 | ≧25 | 66.0 | 64.0 | 61.5 | ○ | present | 185 |
| 7 | Example 7 | 0.90 | ≧25 | ≧25 | ≧25 | 65.5 | 63.5 | 62.5 | ○ | present | 173 |
| 8 | Example 8 | 1.10 | ≧25 | ≧25 | ≧25 | 65.0 | 64.5 | 63.0 | ○ | present | 180 |
| 9 | Example 9 | 0.90 | ≧25 | ≧25 | ≧25 | 66.5 | 63.5 | 60.0 | ○ | present | 178 |
| 10 | Comparative Example 1 | 1.50 | ≧25 | ≧25 | 21 | 65.5 | 53.0 | 36.0 | ○ | present | 170 |
| 11 | Comparative Example 2 | 2.00 | ≧25 | n.d. | n.d. | 63.5 | n.d. | n.d. | XX | present | — |
| 12 | Comparative Example 3 | 1.80 | ≧25 | 19 | 12 | 62.0 | 34.5 | 24.5 | X | none | 160 |
| 13 | Comparative Example 4 | 2.00 | ≧25 | n.d. | n.d. | 63.5 | n.d. | n.d. | XX | none | — |
| 14 | Comparative Example 5 | 2.50 | 15 | n.d. | n.d. | 35.0 | n.d. | n.d. | XX | none | — |
| 15 | Comparative Example 6 | 2.80 | 17 | n.d. | n.d. | 36.0 | n.d. | n.d. | XX | none | — |

*1Showing amount added (solid content) of cement dispersant to binder. Unit is wt %.
*2Numeral values are all those of slump or slump flow (unit: cm), the expression "n.d." means that measurement cannot be made, because of excessive separation of fine aggregates & course aggregates.
*3"○" indicates the good condition of concrete, "X" indicates separation tendency of fine aggregates & course aggregates, and "XX" indicates apparent material separation.
*4"present" when setting started within 24 hours, and "none" when setting did not start within 24 hours.

TABLE 7

Concrete test result [Concrete Formulation-2 (W/B = 12%)]

| Test No. | Copolymer No. | Amount added*1 | Slump (cm)*2 Immediately after | 1 Hour | 2 Hours | Slump flow(cm)*2 Immediately after | 1 Hour | 2 Hours | Appearance*3 | Setting*4 | Compression strength (N/mm$^2$) |
|---|---|---|---|---|---|---|---|---|---|---|---|
| 21 | Example 1 | 2.59 | ≧25 | ≧25 | ≧25 | 64.5 | 62.5 | 60.0 | ○ | present | 172 |
| 22 | Example 2 | 2.70 | ≧25 | ≧25 | ≧25 | 66.0 | 63.0 | 60.5 | ○ | present | 175 |
| 23 | Example 4 | 2.50 | ≧25 | ≧25 | ≧25 | 64.0 | 62.0 | 60.5 | ○ | present | 166 |
| 24 | Example 5 | 2.75 | ≧25 | ≧25 | ≧25 | 65.0 | 62.0 | 60.0 | ○ | present | 165 |
| 25 | Comparative Example 1 | 3.50 | ≧25 | ≧25 | ≧25 | 64.5 | 59.0 | 42.0 | X | none | 165 |
| 26 | Comparative Example 3 | 4.00 | 18 | 11 | 4 | 28.5 | 22.5 | — | X | none | 145 |
| 27 | Comparative Example 4 | 4.50 | 16 | 8 | 2 | 26.0 | — | — | X | none | 130 |

*1Amount added (solid content) of cement dispersant to binder. Unit is wt %.
*2"—" means that measurement has no significance and was therefore terminated.
*3"○" indicates the good condition of concrete, "X" indicates separation tendency of fine aggregates & course aggregates, and "XX" indicates apparent material separation.
*4"present" when setting started within 24 hours, and "none" when setting did not start within 24 hours.

III. Test Example 2

Evaluation of Water Soluble Amphoteric Copolymer as High Performance AE Water Reducing Agent The water soluble amphoteric copolymer of the present invention was tested within as well as outside of the use-limit of water for not only an ultrahigh performance concrete but also a concrete as high performance AE water reducing agent defined in JIS-A6204.

Here, the water soluble amphoteric copolymer of the present invention and the copolymer described in Example 1 of JP-A 7-33496 as Comparative Example 7 in this test were tested using the concrete formulation shown in Table 8 under the condition that a water/cement ratio is 28%. When kneading concrete, all materials of cement, fine aggregates, course aggregates and water having the copolymer to be tested dissolved therein were added and mixed with a 50 liters forced twin-screw kneading mixer for 90 seconds.

Slump, slump flow and external quality of the concrete were determined immediately after discharge, after 30 minutes and after 1 hour, and the concrete left standing in a thermostatic chamber at 20° C. was examined if setting initiates within 10 hours.

As is evident from the results shown in Table 9, the water soluble amphoteric copolymer obtained by the present invention can suitably be used for not only an ultrahigh performance concrete, but a ready-mixed concrete at or over the upper limit of use for high performance AE water reducing agent defined in JIS-A6204. Contrary to this, slump and slump flow after 1 hours were extremely lower, poor external quality with a problem on hardening were observed in Comparative Example 7 in which compound A differs from the copolymer of the present invention. The effect according to the present invention observed herewith is far superior to the effect possibly predicted from the prior art in the pertinent art.

TABLE 8

Formulation of concrete (unit: kg/m$^3$)

| | Formulation No. Formulation-3 |
|---|---|
| W/C (%) | 28.0 |
| Water*1 | 165 |
| Cement*2 | 590 |
| Fine aggregates*3 | 647 |
| Course aggregates*4 | 964 |

*1City water
*2The blend of three brands with equivalent amount of General Portland cement (specific gravity 3.16)
*3Land sand from Kimitsu (specific gravity 2.63)
*4Lime crushed stone from Torikatayama (specific gravity 2.70)

TABLE 9

Concrete test result [Concrete Formulation-3]

| Test No. | Copolymer No. | Addition amount*1 | Slump (cm) Immediately after | Half hour | 1 Hour | Slump flow (cm) Immediately after | Half hour | 1 Hour | Appearance*2 | Setting*3 |
|---|---|---|---|---|---|---|---|---|---|---|
| 31 | Example 1 | 0.40 | ≧25 | ≧25 | ≧25 | 63.0 | 64.0 | 61.5 | ○ | present |
| 32 | Example 5 | 0.40 | ≧25 | ≧25 | ≧25 | 65.0 | 63.0 | 60.5 | ○ | present |

TABLE 9-continued

Concrete test result [Concrete Formulation-3]

| Test No. | Copolymer No. | Addition amount*1 | Slump (cm) | | | Slump flow (cm) | | | Appearance*2 | Setting*3 |
|---|---|---|---|---|---|---|---|---|---|---|
| | | | Immediately after | Half hour | 1 Hour | Immediately after | Half hour | 1 Hour | | |
| 33 | Comparative Example 7 | 0.60 | ≧25 | ≧25 | 19 | 66.0 | 54.0 | 35.0 | X | none |

*1 Amount added (solid content) of cement dispersant to binder. Unit is wt %.
*2 "○" indicates satisfactory condition of concrete by visual observation, and "X" indicates ununiform mixing of fine aggregates & course aggregates.
*3 "present" when setting started within 10 hours, and "none" when setting did not start within 10 hours.

Industrial Applicability

As described above in detail, the cement dispersant of the present invention has a very high water reducing effect and a very excellent slump flow retention, and is suitable for not only a cement dispersant for a usual concrete, but also a dispersant for an ultrahigh performance concrete represented by, in particular, a high-flow concrete. Moreover, the above mentioned water soluble amphoteric copolymer according to the present invention can be used appropriately as a high performance AE water reducing agent among other uses.

The concrete composition of the present invention to which the cement dispersant of the present invention having the above-mentioned excellent properties is blended is very good in water reducing effect, slump flow retention and strength development and the like, and is thus excellent in field workability.

Thus, the present invention provides a dispersant and a water reducing agent desired in the present field, and contribution to the pertinent field is tremendous.

What is claimed is:

1. A cement dispersant comprising as the main component of a water-soluble amphoteric copolymer obtained by copolymerizing an addition compound (compound A) obtained by addition of 0–8 moles of an alkylene oxide having 2 to 4 carbon atoms to one equivalent of amino residue in polyamide polyamine obtained by condensation of 1.0 mole of a polyalkylene polyamine, 0.8–0.95 mole of a dibasic acid or an ester of the dibasic acid with a lower alcohol having 1 to 4 carbon atoms, and 0.05–0.18 mole of acrylic acid or methacrylic acid, or an ester of acrylic acid or methacrylic acid with a lower alcohol having 1 to 4 carbon atoms, and a compound (compound B) of the formula I:

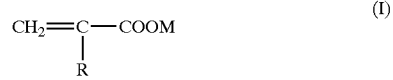

(wherein, R is hydrogen atom or methyl group, and M is hydrogen atom, an alkali metal, ammonium group or alkanolammonium group); and a compound (compound C) of the formula II:

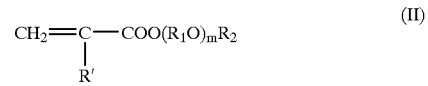

(wherein, R' is hydrogen atom or methyl group, $R_1$ is $C_2$–$C_4$ alkylene group, $R_2$ is hydrogen atom or $C_1$–$C_4$ alkyl group, and m is an integer of 1 to 100), in the ratio of compound A: compound B: compound C=10–40% by weight: 10–40% by weight: 50–80% by weight.

2. The cement dispersant as claimed in claim 1, which is compounded with an ultrahigh performance concrete composition.

3. A concrete composition containing the cement dispersant as claimed in claim 1.

4. The concrete composition as claimed in claim 3, which is for an ultrahigh performance concrete.

* * * * *